US012644080B2

(12) United States Patent
Wang

(10) Patent No.: US 12,644,080 B2
(45) Date of Patent: Jun. 2, 2026

(54) HIGH EFFICIENCY COOLING WINE AERATOR

(71) Applicant: NINGBO HOLY BULL PLASTIC INDUSTRY CO., LTD., Ningbo City (CN)

(72) Inventor: Lei Wang, Ningbo City (CN)

(73) Assignee: NINGBO HOLY BULL PLASTIC INDUSTRY CO., LTD., Ningbo City (CN)

( * ) Notice: Subject to any disclaimer, the term of this patent is extended or adjusted under 35 U.S.C. 154(b) by 412 days.

(21) Appl. No.: 18/377,705

(22) Filed: Oct. 6, 2023

(65) Prior Publication Data

US 2024/0417655 A1     Dec. 19, 2024

(30) Foreign Application Priority Data

Jun. 15, 2023   (CN) .......................... 202310708084.3

(51) Int. Cl.
*C12G 1/00*          (2019.01)
*B01F 23/232*     (2022.01)
(Continued)

(52) U.S. Cl.
CPC .............. *C12G 1/00* (2013.01); *B01F 23/232* (2022.01); *B01F 23/237611* (2022.01); *B01F 35/189* (2022.01); *B01F 35/602* (2022.01); *B01F 35/92* (2022.01); *B01F 2035/98* (2022.01); *B01F 2101/17* (2022.01)

(58) Field of Classification Search
CPC ........... B01F 23/232; B01F 23/237611; B01F 35/189; B01F 35/602; B01F 35/92; B01F 2035/98; B01F 2101/17; C12G 1/00

USPC .............. 261/140.1; 99/277.1, 277.2, 323.1; 426/474

See application file for complete search history.

(56) References Cited

U.S. PATENT DOCUMENTS

| | | | |
|---|---|---|---|
| 9,719,061 B2 * | 8/2017 | Buzzard | ............ B01F 23/23411 |
| 12,357,952 B2 * | 7/2025 | Kornacki | .............. B01F 23/802 |

(Continued)

*Primary Examiner* — Charles S Bushey
(74) *Attorney, Agent, or Firm* — Maschoff Brennan

(57) ABSTRACT

A high efficiency cooling wine aerator includes a tannin balancing piece, a wine aerator body, an ice kettle, an aeration nozzle and a bracket. A cooling cavity is arranged in the wine aerator body; the upper end of the wine aerator body is provided with an opening led to the cooling cavity; the bottom end of the cooling cavity forms a shrinking mouth; the lower end of the wine aerator body is provided with a first connector; the first connector is provided with an aeration cavity led to the shrinking mouth; the lower end of the first connector is provided with a plurality of air inlet grooves at intervals; the tannin balancing piece is detachably connected to the opening at the upper end of the wine aerator body; the ice kettle is placed in the cooling cavity; the aeration nozzle includes an aeration nozzle body and a second connector arranged above the aeration nozzle body; the aeration nozzle is detachably connected below the wine aerator body through the second connector; and the bracket includes a supporting seat and a plurality of supporting feet arranged at the circumferential side of the supporting seat at intervals. The high efficiency cooling wine aerator of the present invention is detachable, convenient in cleaning, coolable during decanting and small in noise during decanting.

10 Claims, 5 Drawing Sheets

(51) Int. Cl.

| | |
|---|---|
| B01F 23/237 | (2022.01) |
| B01F 35/00 | (2022.01) |
| B01F 35/60 | (2022.01) |
| B01F 35/92 | (2022.01) |
| *B01F 35/90* | (2022.01) |
| *B01F 101/17* | (2022.01) |

(56) References Cited

U.S. PATENT DOCUMENTS

| | | | |
|---|---|---|---|
| 2011/0005401 A1* | 1/2011 | Burroughs | A47G 19/2205 |
| | | | 99/323.1 |
| 2011/0271846 A1* | 11/2011 | Hynes | B01F 23/23412 |
| | | | 261/103 |
| 2022/0176328 A1* | 6/2022 | Kornacki | B01F 23/2323 |

\* cited by examiner

HIGH EFFICIENCY COOLING WINE AERATOR

TECHNICAL FIELD

The present invention relates to the technical field of wine aerators, and particularly relates to a high efficiency cooling wine aerator.

BACKGROUND

The wine aerator, also known as a wine aerator bottle or a wine aerator kettle, is a vessel used when drinking fermented wine. The function of the wine aerator is to make the wine come into contact with the air, volatilize sulfur dioxide in the wine, make the wine oxidize with the air, soften the tannins, and make the wine taste better when drinking. At present, the internal pipeline of the conventional wine aerator is connected into a whole, which is difficult to clean the inside. To accelerate the decanting speed, two air inlet holes are arranged at both sides of the pipeline of the wine aerator to mix the air with the wine through the air inlet holes by the Bernoulli principle to promote the oxidation of the wine, but the structures of the two air inlet holes make the decanting speed slow and the noise large during decanting. Research data indicate that the best drinking temperature of the wine is about 13° C. In order to achieve the best low temperature state of the wine when drinking, the commonly used method is to add a small amount of ice in the wine aerator. Although this method can cool the wine, the melted ice is mixed in the wine, which greatly influences the quality and taste of the wine.

SUMMARY

A technical problem to be solved by the present invention is to provide a high efficiency cooling wine aerator with reasonable structure respect to the problems of the prior art.

A technical solution adopted to solve the above technical problems by the present invention is as follows:

A high efficiency cooling wine aerator, comprising a tannin balancing piece, a wine aerator body, an ice kettle, an aeration nozzle and a bracket which are arranged successively from top to bottom, wherein a cooling cavity is arranged in the wine aerator body; the upper end of the wine aerator body is provided with an opening led to the cooling cavity; the bottom end of the cooling cavity forms a shrinking mouth; the diameter of the opening is greater than the diameter of the shrinking mouth; the lower end of the wine aerator body is provided with a first connector; the first connector is provided with an aeration cavity led to the shrinking mouth; and the aeration cavity penetrates downward through the first connector;

the tannin balancing piece is detachably connected to the opening at the upper end of the wine aerator body; the tannin balancing piece comprises a sunken tannin balancing piece body; the tannin balancing piece body extends into the cooling cavity; the upper end of the tannin balancing piece is annularly provided with a plurality of vent holes led to the cooling cavity at intervals; the bottom of the tannin balancing piece body is provided with a wine inlet hole; and the wine inlet hole is provided with a filter screen;

the ice kettle is placed in the cooling cavity; the ice kettle comprises an ice kettle body and a kettle lid; a spout is arranged above the ice kettle body; the kettle lid is connected outside the spout; a pressure relief pad is arranged between the ice kettle body and the kettle lid; the pressure relief pad comprises a pressure relief pad body, and a connecting ring arranged at the circumferential side of the upper end of the pressure relief pad body; a pressure relief cavity is arranged in the pressure relief pad body; an opening led to the pressure relief cavity is arranged above the pressure relief pad; the connecting ring is erected above the spout of the ice kettle body; the kettle lid is connected outside the spout of the ice kettle body by threads; the center of the kettle lid is provided with an installing hole; the installing hole is provided with a baffle venting plug; and the cooling cavity is divided by the ice kettle into an upper cavity body located above the ice kettle and a lower cavity body located below the ice kettle;

the aeration nozzle comprises an aeration nozzle body and a second connector arranged above the aeration nozzle body; the aeration nozzle is detachably connected below the wine aerator body through the second connector; a recess is arranged in the second connector; a clamping groove comprises a clamping part arranged transversely and an importing part extending upward from one end of the clamping part; the first connector extends into the recess; the lower end of the first connector is matched with the recess; air inlet passages are formed between air inlet grooves of the first connector and the second connector; a plurality of air inlet holes led to the outer end of each air inlet passage are arranged annularly in the second connector at intervals; the air inlet holes are led to the lower part of the aeration nozzle; the bracket comprises a supporting seat and a plurality of supporting feet arranged at the circumferential side of the supporting seat at intervals; the supporting seat is provided with a connecting hole perforated up and down; and the wine aerator body is erected on the supporting seat.

Wherein an anti-slip groove is arranged at the circumferential direction of the outer wall of the wine aerator body, and an anti-slip silicone case is sleeved on the anti-slip groove.

Wherein the lower end of the first connector is provided with four air inlet grooves led from the outer wall of the first connector to the aeration cavity at intervals; the air inlet grooves extend obliquely downward from outside to inside; and the outer wall of the first connector is provided with a clamping block.

Wherein the pressure relief pad is a silicone pressure relief pad.

Wherein the baffle venting plug is an umbrella structure; the baffle venting plug comprises an umbrella cover and an umbrella handle that extends axially from the center of the umbrella cover; the end of the umbrella handle is provided with a ball head with a diameter larger than the umbrella handle; the side wall of the ball head is provided with an exhaust groove; the baffle venting plug is made of silicone material; the umbrella handle of the baffle venting plug is inserted into the installing hole; and the bottom of the umbrella cover is fitted with the top of the kettle lid.

Wherein the side wall of the ice kettle body is provided with a plurality of convex ribs at intervals; the ice kettle body is erected in the wine aerator body through the convex ribs; the convex ribs are in clearance fit with the inner wall of the wine aerator body; a groove is formed between any adjacent convex ribs; and a passage for communicating the upper cavity and the lower cavity is formed between the groove and the wine aerator body.

Wherein the tannin balancing piece further comprises a flange arranged on the upper end of the tannin balancing piece body, and a handle arranged on one side of the flange; and the flange is erected on the upper end of the wine aerator body.

Wherein the inner side wall of the second connector is provided with the clamping groove matched with the clamping block; the first connector is connected with the second connector through the clamping block; a mixed flow channel has a trumpet shape with a small upper part and a large lower part; reinforcing ribs are arranged at the circumferential side of the aeration nozzle body at intervals; and the reinforcing ribs extend from top to bottom along the aeration nozzle body.

Wherein the aeration nozzle extends downward through the connecting hole; clamping pieces are arranged at the circumferential side of the supporting seat at intervals, and the lower end of the wine aerator body is limited on the inner sides of the clamping pieces; the supporting feet are limited on the outer side of a glass body of the wine glass; a limiting part is arranged between the supporting seat and the supporting feet; the limiting part is annular; the outer diameter of the upper end of the limiting part is greater than the outer diameter of the lower end of the limiting part; the lower end of the limiting part is integrally connected to the lower end of the supporting seat around the supporting seat; the upper ends of the supporting feet are integrally connected outside the upper end of the limiting part; and the limiting part is inserted into the glass body of the wine glass.

Wherein the aeration nozzle body is provided with the mixed flow channel which extends downward from the recess, the upper end of the mixed flow channel is led to the aeration cavity, and the lower end of the mixed flow channel penetrates downward through the aeration nozzle body.

The high efficiency cooling wine aerator of the present invention is formed by detachably connecting the tannin balancing piece, the wine aerator body, the ice kettle, the aeration nozzle, the bracket, and other components, and is detachable, convenient for cleaning and more hygienic and healthy. The ice kettle is put into the wine aerator body, which can play a role of cooling the wine while decanting. The groove is formed in the ice kettle body of the ice kettle, thereby increasing the contact area between the wine and the ice kettle body during decanting and improving the cooling efficiency. Four air inlet grooves are arranged at the first connector of the wine aerator body, which increases the air inflow of the aeration cavity and accelerates the oxidation reaction between the wine and the air, the softening of tannins and the volatilization of sulfur dioxide so that the decanting efficiency is high. The arrangement of the four air inlet grooves can make the air intake more balanced and reduce the phenomena of turbulence, vortex, etc. in the aeration cavity, so as to reduce the noise generated during decanting. The air inlet grooves of the wine aerator body are grooved for convenient cleaning. The bracket is provided with an annular limiting part and supporting feet. The limiting part can be limited to the inner side of the wine glass. The supporting feet can be limited to the outer side of the wine glass, and can be matched with most of the wine glasses on the market, with wide range of application.

DETAILED DESCRIPTION

The present invention is further described below in detail in combination with the drawings and embodiments.

Figure 1:
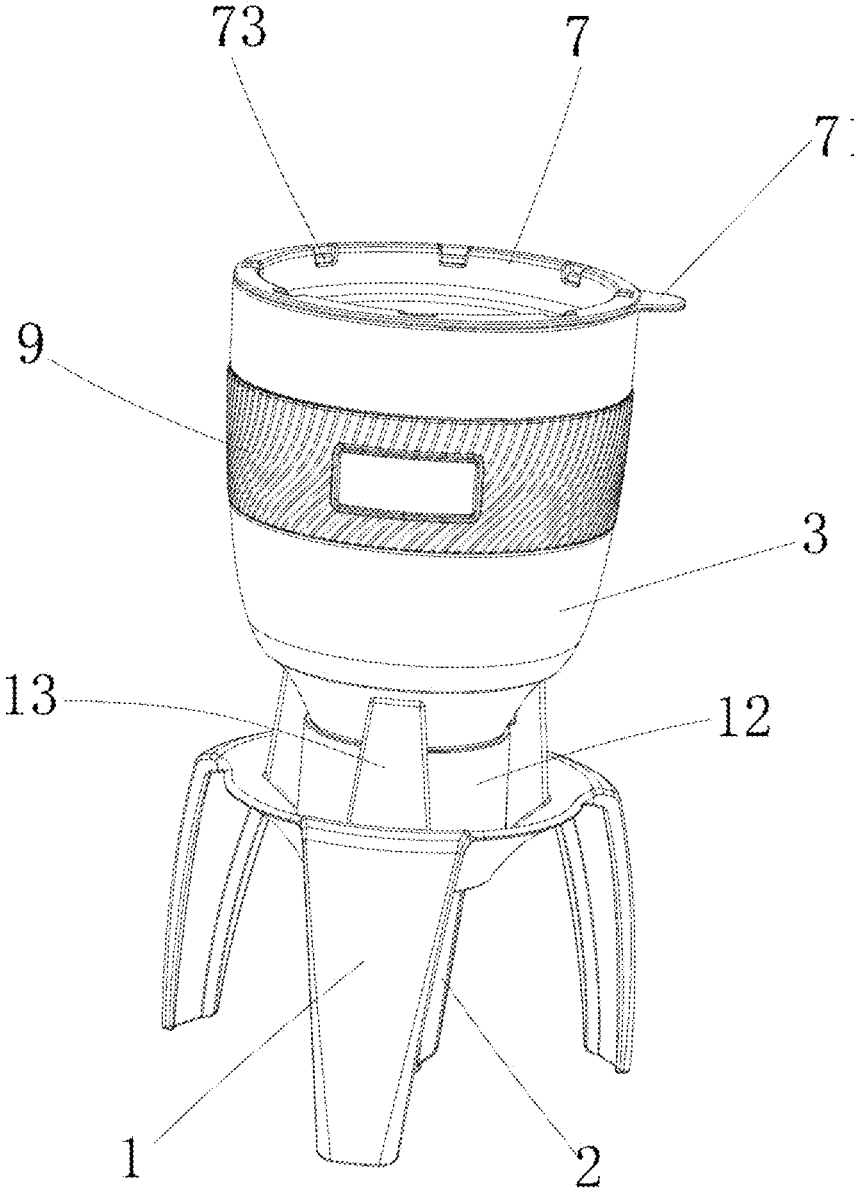
FIG. 1 is a stereographic schematic diagram of a high efficiency cooling wine aerator of the present invention.
Figure 2:
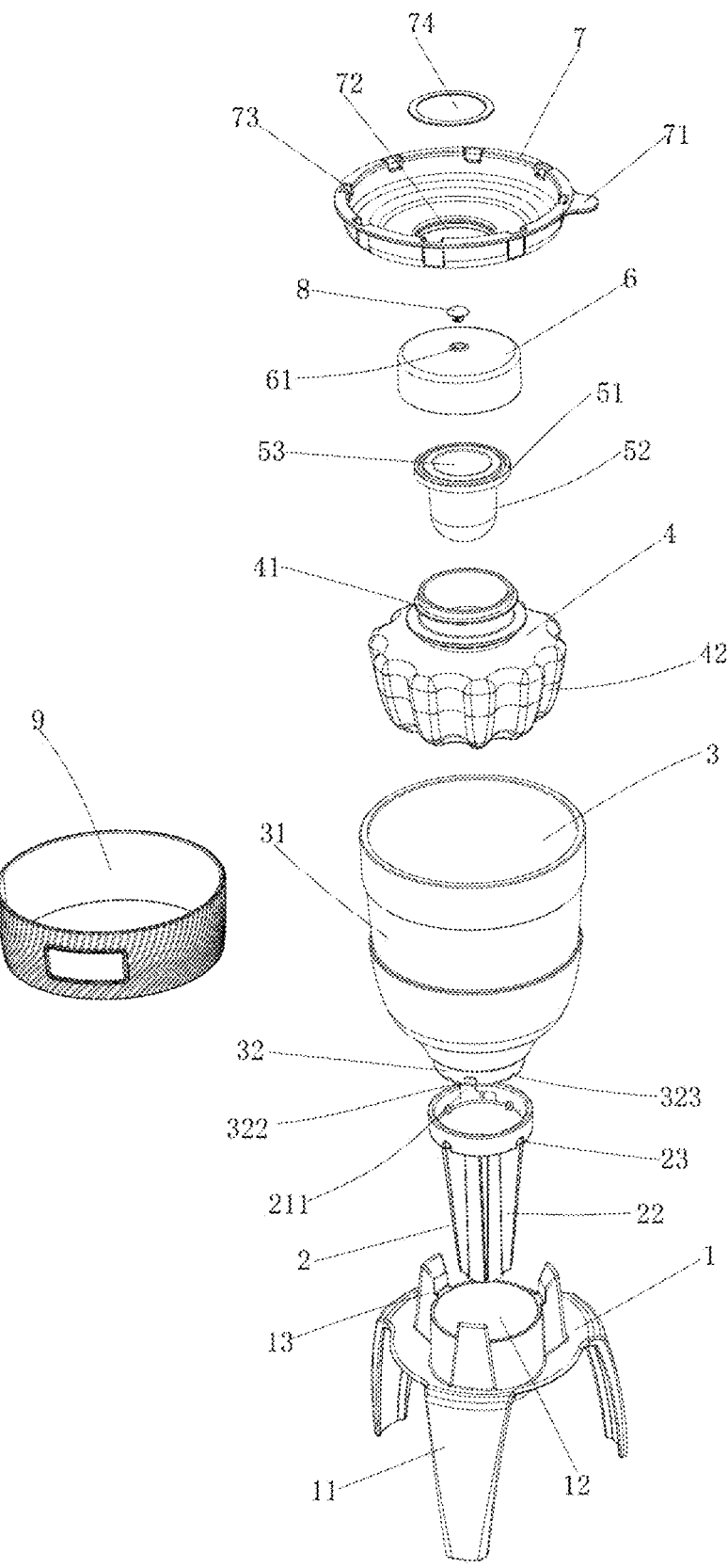
FIG. 2 is an exploded diagram 1 of a high efficiency cooling wine aerator of the present invention.
Figure 3:
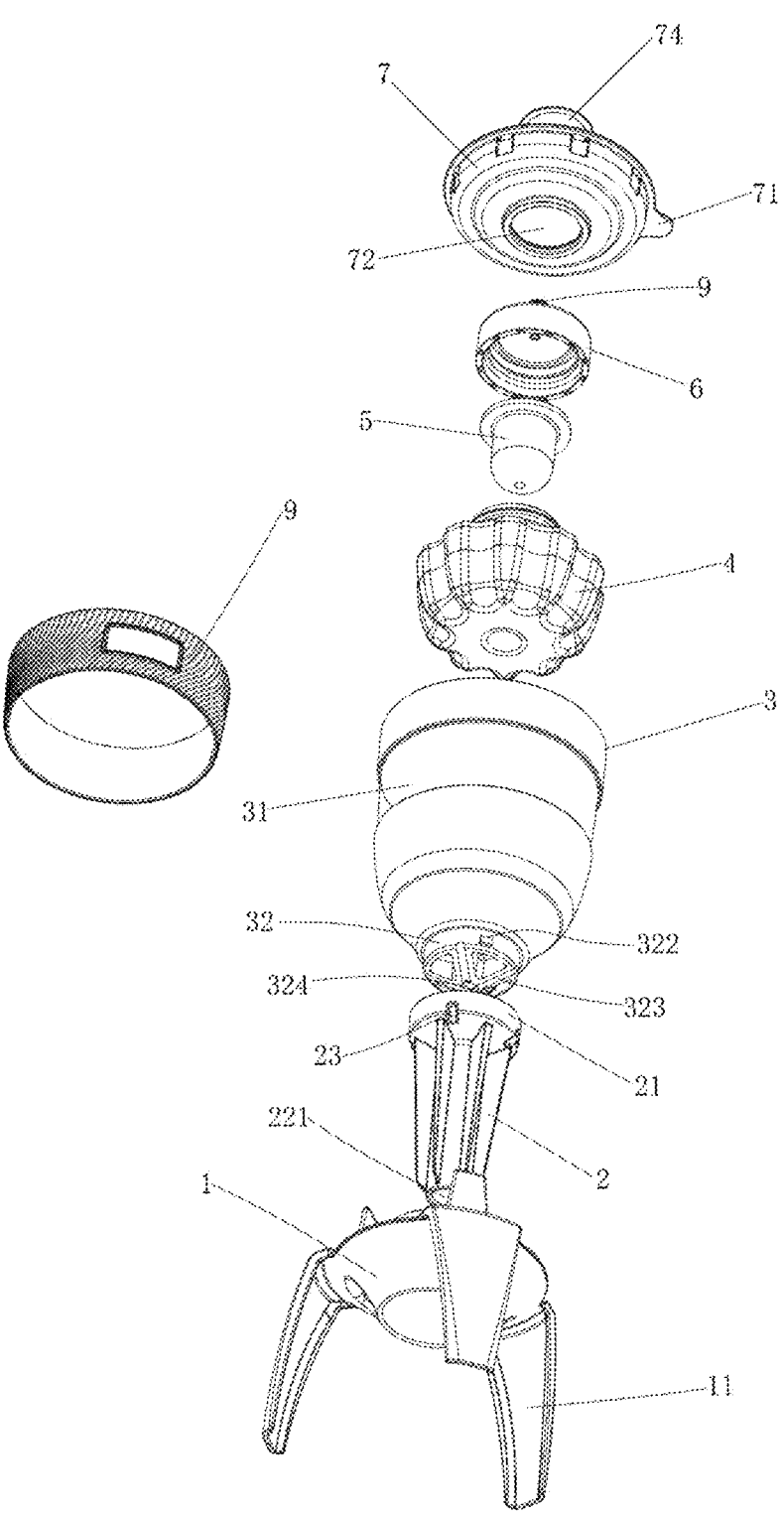
FIG. 3 is an exploded diagram 2 of a high efficiency cooling wine aerator of the present invention.
Figure 4:
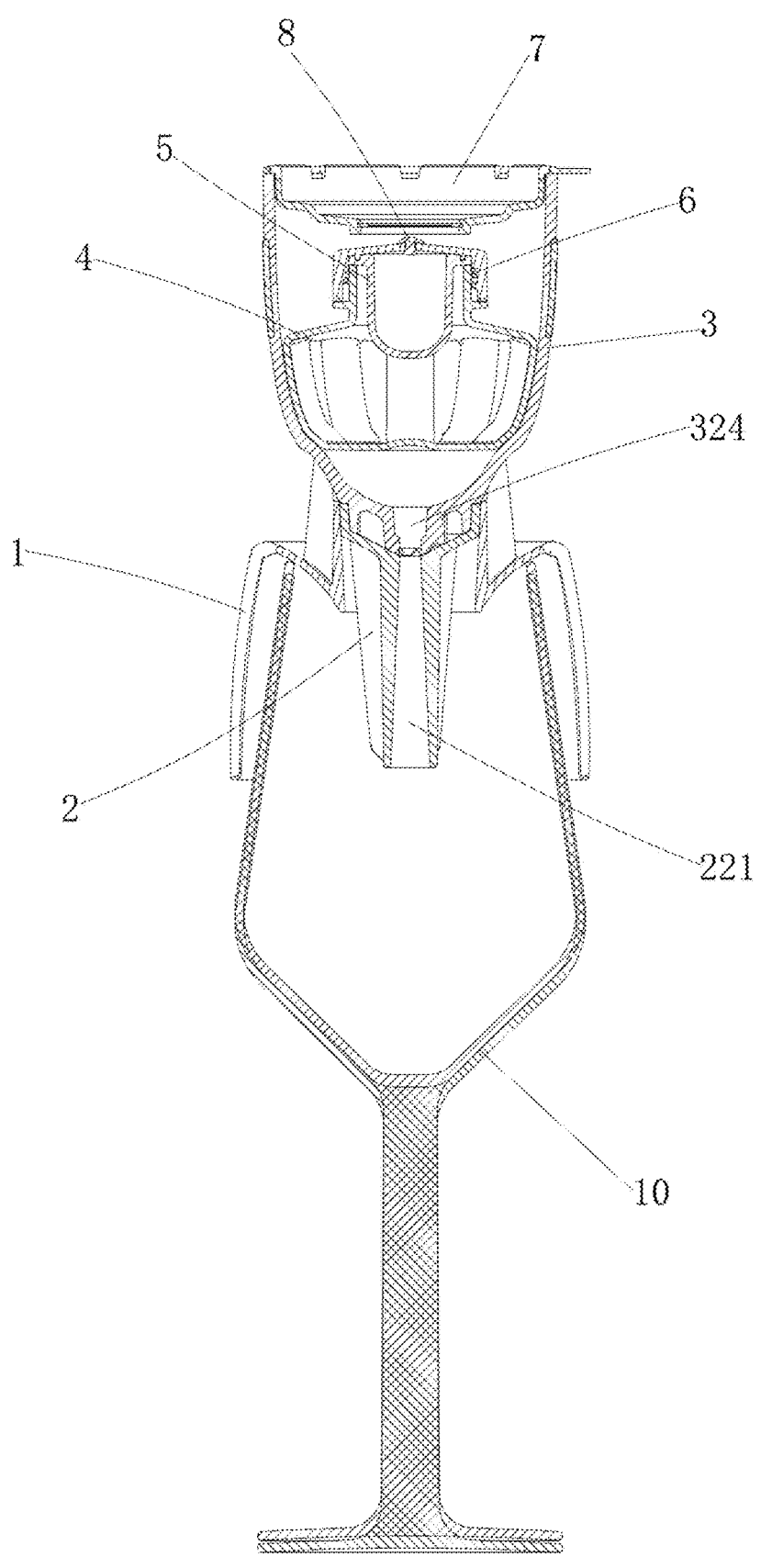
FIG. 4 is a sectional view after a high efficiency cooling wine aerator is placed on a wine glass in the present invention.
Figure 5:
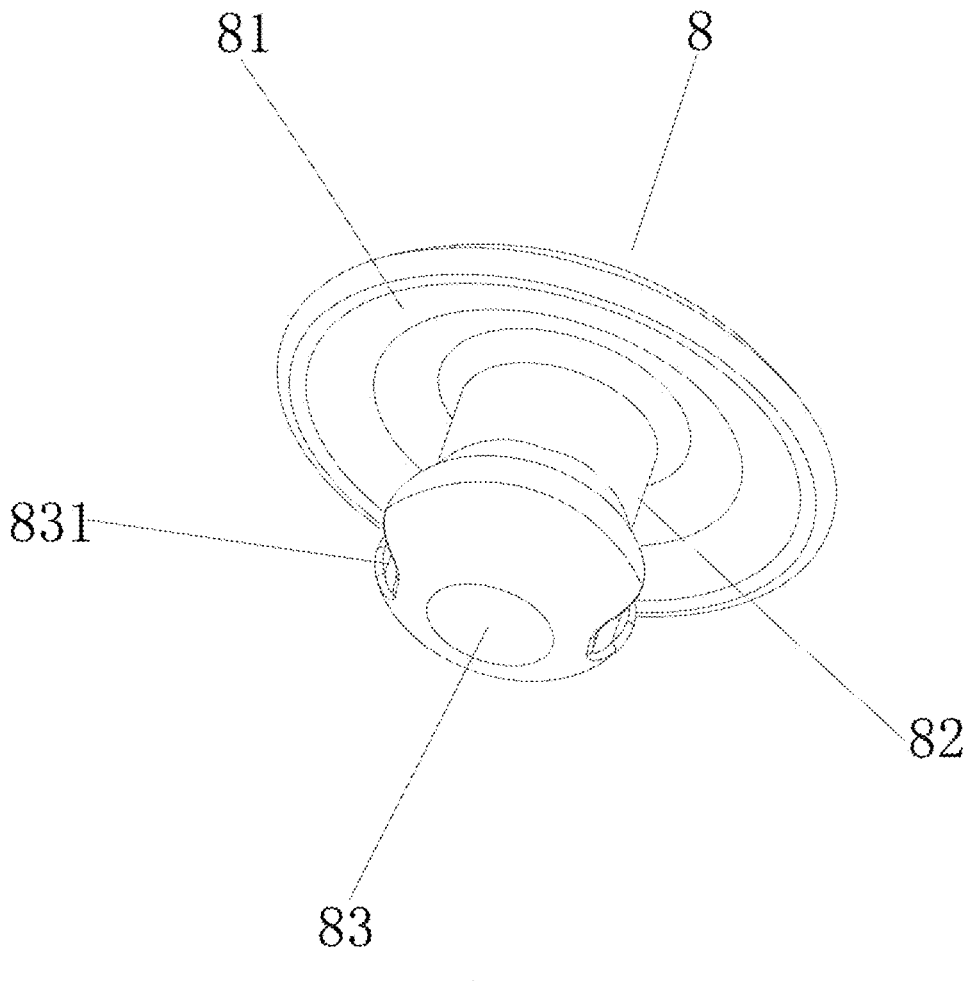
FIG. 5 is a structural diagram of a baffle venting plug of a high efficiency cooling wine aerator of the present invention.

As shown in FIG. 1 to FIG. 5, a high efficiency cooling wine aerator comprises a tannin balancing piece 7, a wine aerator body 3, an ice kettle, an aeration nozzle 2 and a bracket 1 which are arranged successively from top to bottom. An anti-slip groove 31 is arranged at the circumferential direction of the outer wall of the wine aerator body 3, and an anti-slip silicone case 9 is sleeved on the anti-slip groove 31. A cooling cavity is arranged in the wine aerator body 3; the upper end of the wine aerator body 3 is provided with an opening led to the cooling cavity; the bottom end of the cooling cavity forms a shrinking mouth; the diameter of the opening is greater than the diameter of the shrinking mouth; the lower end of the wine aerator body 3 is provided with a first connector 32; the first connector 32 is provided with an aeration cavity 324 led to the shrinking mouth; and the aeration cavity 324 penetrates downward through the first connector 32. The lower end of the first connector 32 is provided with four air inlet grooves 323 led from the outer wall of the first connector 32 to the aeration cavity 324 at intervals; the air inlet grooves 323 extend obliquely downward from outside to inside; and the outer wall of the first connector 32 is provided with a clamping block 322.

The tannin balancing piece 7 is detachably connected to the opening at the upper end of the wine aerator body 3; the tannin balancing piece 7 comprises a sunken tannin balancing piece body, a flange arranged on the upper end of the tannin balancing piece body, and a handle 71 arranged on one side of the flange; the flange is erected on the upper end of the wine aerator body 3; the tannin balancing piece body extends into the cooling cavity; the upper end of the tannin balancing piece 7 is annularly provided with a plurality of vent holes 73 led to the cooling cavity at intervals; the bottom of the tannin balancing piece body is provided with a wine inlet hole 72; and the wine inlet hole 72 is provided with a filter screen 74.

The ice kettle is placed in the cooling cavity; the ice kettle comprises an ice kettle body 4 and a kettle lid 6; a spout 41 is arranged above the ice kettle body 4; the kettle lid 6 is connected outside the spout 41; a pressure relief pad 5 is arranged between the ice kettle body 4 and the kettle lid 6; the pressure relief pad 5 is a silicone pressure relief pad; the pressure relief pad 5 comprises a pressure relief pad body 52, and a connecting ring 51 arranged at the circumferential side of the upper end of the pressure relief pad body 52; a pressure relief cavity 53 is arranged in the pressure relief pad body 52; an opening led to the pressure relief cavity 53 is arranged above the pressure relief pad 5; the connecting ring 51 is erected above the spout 41 of the ice kettle body 4; the kettle lid 6 is connected outside the spout 41 of the ice kettle body 4 by threads; the center of the kettle lid 6 is provided with an installing hole 61; the installing hole 61 is provided with a baffle venting plug 8; the pressure relief pad 5 can be compressed upward when the volume of water frozen into ice is increased to prevent the ice kettle from being broken by ice; the baffle venting plug 8 can discharge gas outward when the pressure relief pad 5 is compressed to play a pressure relief role on the pressure relief cavity 53; the side wall of the ice kettle body 4 is provided with a plurality of convex ribs at intervals; the ice kettle body 4 is erected in the wine aerator body 3 through the convex ribs; the convex ribs are in clearance fit with the inner wall of the wine aerator body 3; the cooling cavity is divided by the ice kettle into an upper cavity body located above the ice kettle and a lower cavity body located below the ice kettle; a groove 42 is formed between any adjacent convex ribs; and a passage for communicating the upper cavity and the lower cavity is formed between the groove 42 and the wine aerator body 3.

The baffle venting plug 8 is an umbrella structure; the baffle venting plug 8 comprises an umbrella cover 81 and an umbrella handle 82 that extends axially from the center of the umbrella cover 81; the end of the umbrella handle 82 is provided with a ball head 83 with a diameter larger than the umbrella handle 82; the ball head 83 can prevent the baffle venting plug 8 from falling from the kettle lid 6; the side wall of the ball head 83 is provided with exhaust grooves 831; and the baffle venting plug 8 is made of silicone material. In the present embodiment, two exhaust grooves 831 are arranged.

The umbrella handle 82 of the baffle venting plug 8 is inserted into the installing hole 61; and the bottom of the umbrella cover 81 is fitted with the top of the kettle lid 6.

After the ice in the wine aerator melts into water, more space is occupied so that the inside air passes through the exhaust grooves 831 and the gap between the umbrella handle 82 and the installing hole 61 and pushes up and discharges the umbrella cover 81.

The baffle venting plug 8 not only ensures exhaust, but also prevents red wine from flowing into the silicone pressure relief pad through the installing hole 61 when the red wine is poured. The baffle venting plug 8 is simple in structure and convenient to use.

The aeration nozzle 2 comprises an aeration nozzle body 22 and a second connector 21 arranged above the aeration nozzle body 22; the aeration nozzle 2 is detachably connected below the wine aerator body 3 through the second connector 21; a recess is arranged in the second connector 21; the inner side wall of the second connector 21 is provided with a clamping groove 211 matched with the clamping block 322; the first connector 32 is connected with the second connector 21 through the clamping block 322; the clamping groove 211 comprises a clamping part arranged transversely and an importing part extending upward from one end of the clamping part; the first connector 32 extends into the recess; the lower end of the first connector 32 is matched with the recess; air inlet passages are formed between air inlet grooves 323 of the first connector 32 and the second connector 21; a plurality of air inlet holes 23 led to the outer end of each air inlet passage are arranged annularly in the second connector 21 at intervals; the air inlet holes 23 are led to the lower part of the aeration nozzle 2; the aeration nozzle body 22 is provided with a mixed flow channel 221 which extends downward from the recess; the mixed flow channel 221 has a trumpet shape with a small upper part and a large lower part; the upper end of the mixed flow channel 221 is led to the aeration cavity 324, and the lower end of the mixed flow channel 221 penetrates downward through the aeration nozzle body 22; reinforcing ribs are arranged at the circumferential side of the aeration nozzle body 22 at intervals; and the reinforcing ribs extend from top to bottom along the aeration nozzle body 22.

The bracket 1 comprises a supporting seat 12 and a plurality of supporting feet 11 arranged at the circumferential side of the supporting seat 12 at intervals; the supporting seat 12 is provided with a connecting hole perforated up and down; the wine aerator body 3 is erected on the supporting seat 12; the aeration nozzle 2 extends downward through the connecting hole; clamping pieces 13 are arranged at the circumferential side of the supporting seat 12 at intervals, and the lower end of the wine aerator body 3 is limited on the inner sides of the clamping pieces 13; the supporting feet 11 are limited on the outer side of a glass body of the wine glass; a limiting part is arranged between the supporting seat 12 and the supporting feet 11; the limiting part is annular; the outer diameter of the upper end of the limiting part is greater than the outer diameter of the lower end of the limiting part; the lower end of the limiting part is integrally connected to the lower end of the supporting seat 12 around the supporting seat 12; the upper ends of the supporting feet 11 are integrally connected outside the upper end of the limiting part; and the limiting part is inserted into the glass body of the wine glass.

During use, after water is poured into the ice kettle, the volume of ice is expanded; the pressure relief pad 5 is compressed; and the pressure relief pad 5 relieves pressure through a pressure relief port to prevent the ice kettle from being broken. The ice kettle is put into the wine aerator body; the tannin balancing piece 7, the wine aerator body 3, the aeration nozzle 2 and the bracket 1 are connected successively; and the high efficiency cooling wine aerator is connected. The bracket 1 is erected above the wine glass 10, and the wine is poured into the tannin balancing piece 7. At this time, some tannins in the wine oxidize with the air. The wine enters the cooling cavity through the filter screen 74 and the wine inlet hole 72. The air part in the cooling cavity flows upward from the vent hole of the tannin balancing piece 7, so that the air pressure inside and outside the cooling cavity is balanced. The baffle venting plug 8 prevents the wine from entering the pressure relief cavity 53 through the installing hole 61 of kettle lid 6 when the wine is poured down through the tannin balancing piece 7. The wine flows from the top of the kettle lid 6 to the ice kettle body 4, and also flows from the groove 42 of the ice kettle body 4 to the lower cavity body and the aeration cavity 324 successively. The groove 42 of the ice kettle body 4 increases the contact area between the ice kettle body 4 and the wine, so that the wine is cooled rapidly. When the wine flows into the mixed flow channel 221 through aeration cavity 324, the pressure of the connecting part between the aeration cavity 324 and the mixed flow channel 221 is reduced. The external air enters the connecting part between the aeration cavity 324 and the mixed flow channel 221 through the air inlet hole 23 and the air inlet groove 323 under normal pressure. The air is fully mixed with the wine to achieve the purpose of rapid decanting. After decanting, the high efficiency cooling wine aerator can be placed on a table through the bracket 1, or can be disassembled for cleaning.

The high efficiency cooling wine aerator of the present invention is formed by detachably connecting the tannin balancing piece 7, the wine aerator body 3, the ice kettle, the aeration nozzle 2, the bracket 1, and other components, and is detachable, convenient for cleaning and more hygienic and healthy. The ice kettle is put into the wine aerator body 3, which can play a role of cooling the wine while decanting. The groove 42 is formed in the ice kettle body 4 of the ice kettle, thereby increasing the contact area between the wine and the ice kettle body 4 during decanting and improving the cooling efficiency. Four air inlet grooves 323 are arranged at the first connector 32 of the wine aerator body 3, which increases the air inflow of the aeration cavity 324 and accelerates the oxidation reaction between the wine and the air, the softening of tannins and the volatilization of sulfur dioxide so that the decanting efficiency is high. The arrangement of the four air inlet grooves 323 can make the air intake more balanced and reduce the phenomena of turbulence, vortex, etc. in the aeration cavity 324, so as to reduce the noise generated during decanting. The air inlet grooves 323 of the wine aerator body 3 are grooved for convenient cleaning. The bracket 1 is provided with an annular limiting part and supporting feet 11. The limiting part can be limited to the inner side of the wine glass. The supporting feet 11 can be limited to the outer side of the wine glass, and can be matched with most of the wine glasses on the market, with wide range of application.

Finally, it should be noted that the above embodiments are only used for describing the technical solutions of the present invention rather than limitation. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solution to depart from the spirit and the scope of the technical solution of various embodiments of the present invention.

The invention claimed is:

1. A high efficiency cooling wine aerator, comprising a tannin balancing piece (7), a wine aerator body (3), an ice kettle, an aeration nozzle (2) and a bracket (1) which are arranged successively from top to bottom, wherein a cooling cavity is arranged in the wine aerator body (3); the upper end of the wine aerator body (3) is provided with an opening led to the cooling cavity; the bottom end of the cooling cavity forms a shrinking mouth; the diameter of the opening is greater than the diameter of the shrinking mouth; the lower end of the wine aerator body (3) is provided with a first connector (32); the first connector (32) is provided with an aeration cavity (324) led to the shrinking mouth; and the aeration cavity (324) penetrates downward through the first connector (32);

the tannin balancing piece (7) is detachably connected to the opening at the upper end of the wine aerator body (3); the tannin balancing piece (7) comprises a sunken tannin balancing piece body; the tannin balancing piece body extends into the cooling cavity; the upper end of the tannin balancing piece (7) is annularly provided with a plurality of vent holes (73) led to the cooling cavity at intervals; the bottom of the tannin balancing piece body is provided with a wine inlet hole (72); and the wine inlet hole (72) is provided with a filter screen (74);

the ice kettle is placed in the cooling cavity; the ice kettle comprises an ice kettle body (4) and a kettle lid (6); a spout (41) is arranged above the ice kettle body (4); the kettle lid (6) is connected outside the spout (41); a pressure relief pad (5) is arranged between the ice kettle body (4) and the kettle lid (6); the pressure relief pad (5) comprises a pressure relief pad body (52), and a connecting ring (51) arranged at the circumferential side of the upper end of the pressure relief pad body (52); a pressure relief cavity (53) is arranged in the pressure relief pad body (52); an opening led to the pressure relief cavity (53) is arranged above the pressure relief pad (5); the connecting ring (51) is erected above the spout (41) of the ice kettle body (4); the kettle lid (6) is connected outside the spout (41) of the ice kettle body (4) by threads; the center of the kettle lid (6) is provided with an installing hole (61); the installing hole (61) is provided with a baffle venting plug (8); and the cooling cavity is divided by the ice kettle into an upper cavity body located above the ice kettle and a lower cavity body located below the ice kettle;

the aeration nozzle (2) comprises an aeration nozzle body (22) and a second connector (21) arranged above the aeration nozzle body (22); the aeration nozzle (2) is detachably connected below the wine aerator body (3) through the second connector (21); a recess is arranged in the second connector (21); a clamping groove (211) comprises a clamping part arranged transversely and an importing part extending upward from one end of the clamping part; the first connector (32) extends into the recess; the lower end of the first connector (32) is matched with the recess; air inlet passages are formed between air inlet grooves (323) of the first connector (32) and the second connector (21); a plurality of air inlet holes (23) led to the outer end of each air inlet passage are arranged annularly in the second connector (21) at intervals; the air inlet holes (23) are led to the lower part of the aeration nozzle (2); the bracket (1) comprises a supporting seat (12) and a plurality of supporting feet (11) arranged at the circumferential side of the supporting seat (12) at intervals; the supporting seat (12) is provided with a connecting hole perforated up and down; and the wine aerator body (3) is erected on the supporting seat (12).

2. The high efficiency cooling wine aerator according to claim 1, wherein an anti-slip groove (31) is arranged at the circumferential direction of the outer wall of the wine aerator body (3), and an anti-slip silicone case (9) is sleeved on the anti-slip groove (31).

3. The high efficiency cooling wine aerator according to claim 1, wherein the lower end of the first connector (32) is provided with four air inlet grooves (323) led from the outer wall of the first connector (32) to the aeration cavity (324) at intervals; the air inlet grooves (323) extend obliquely downward from outside to inside; and the outer wall of the first connector (32) is provided with a clamping block (322).

4. The high efficiency cooling wine aerator according to claim 1, wherein the pressure relief pad (5) is a silicone pressure relief pad.

5. The high efficiency cooling wine aerator according to claim 1, wherein the baffle venting plug (8) is an umbrella structure; the baffle venting plug (8) comprises an umbrella cover (81) and an umbrella handle (82) that extends axially from the center of the umbrella cover (81); the end of the umbrella handle (82) is provided with a ball head (83) with a diameter larger than the umbrella handle (82); the side wall of the ball head (83) is provided with an exhaust groove (831); the baffle venting plug (8) is made of silicone material; the umbrella handle (82) of the baffle venting plug (8) is inserted into the installing hole (61); and the bottom of the umbrella cover (81) is fitted with the top of the kettle lid (6).

6. The high efficiency cooling wine aerator according to claim 1, wherein the side wall of the ice kettle body (4) is provided with a plurality of convex ribs at intervals; the ice kettle body (4) is erected in the wine aerator body (3) through the convex ribs; the convex ribs are in clearance fit with the inner wall of the wine aerator body (3); a groove (42) is formed between any adjacent convex ribs; and a passage for communicating the upper cavity and the lower cavity is formed between the groove (42) and the wine aerator body (3).

7. The high efficiency cooling wine aerator according to claim 1, wherein the tannin balancing piece (7) further comprises a flange arranged on the upper end of the tannin balancing piece body, and a handle (71) arranged on one side of the flange; and the flange is erected on the upper end of the wine aerator body (3).

8. The high efficiency cooling wine aerator according to claim 1, wherein the inner side wall of the second connector (21) is provided with the clamping groove (211) matched with a clamping block (322); the first connector (32) is connected with the second connector (21) through the clamping block (322); a mixed flow channel (221) has a trumpet shape with a small upper part and a large lower part; reinforcing ribs are arranged at the circumferential side of the aeration nozzle body (22) at intervals; and the reinforcing ribs extend from top to bottom along the aeration nozzle body (22).

9. The high efficiency cooling wine aerator according to claim 1, wherein the aeration nozzle (2) extends downward through the connecting hole; clamping pieces (13) are arranged at the circumferential side of the supporting seat (12) at intervals, and the lower end of the wine aerator body (3) is limited on the inner sides of the clamping pieces (13); the supporting feet (11) are limited on the outer side of a glass body of the wine glass; a limiting part is arranged between the supporting seat (12) and the supporting feet (11); the limiting part is annular; the outer diameter of the upper end of the limiting part is greater than the outer diameter of the lower end of the limiting part; the lower end of the limiting part is integrally connected to the lower end of the supporting seat (12) around the supporting seat (12); the upper ends of the supporting feet (11) are integrally connected outside the upper end of the limiting part; and the limiting part is inserted into the glass body of the wine glass.

10. The high efficiency cooling wine aerator according to claim 9, wherein the aeration nozzle body (22) is provided with the mixed flow channel (221) which extends downward from the recess, the upper end of the mixed flow channel (221) is led to the aeration cavity (324), and the lower end of the mixed flow channel (221) penetrates downward through the aeration nozzle body (22).

\* \* \* \* \*